United States Patent
Viot et al.

(10) Patent No.: US 7,829,184 B2
(45) Date of Patent: Nov. 9, 2010

(54) MOTOR VEHICLE PART MADE OF PLASTICS MATERIAL COMPRISING POLYPROPYLENE FILLED WITH GLASS FIBERS

(75) Inventors: Frederic Viot, Poncin (FR); Anthony Chene, Jujurieux (FR)

(73) Assignee: Compagnie Plastic Onmium, Lyons (FR)

( * ) Notice: Subject to any disclaimer, the term of this patent is extended or adjusted under 35 U.S.C. 154(b) by 534 days.

(21) Appl. No.: 11/660,511

(22) PCT Filed: Aug. 16, 2005

(86) PCT No.: PCT/FR2005/002090

§ 371 (c)(1), (2), (4) Date: May 17, 2007

(87) PCT Pub. No.: WO2006/021690

PCT Pub. Date: Mar. 2, 2006

(65) Prior Publication Data

US 2007/0275224 A1  Nov. 29, 2007

(30) Foreign Application Priority Data

Aug. 20, 2004  (FR) ................... 04 09026

(51) Int. Cl.
*D04H 1/00* (2006.01)
(52) U.S. Cl. ................. 428/292.1; 428/297.4
(58) Field of Classification Search ............ 428/292.1, 428/297.4
See application file for complete search history.

(56) References Cited

U.S. PATENT DOCUMENTS

| | | | | |
|---|---|---|---|---|
| 4,214,026 A | * | 7/1980 | Ibata et al. ................ 428/67 |
| 5,286,776 A | * | 2/1994 | Ichikawa et al. .......... 524/449 |
| 5,304,422 A | * | 4/1994 | Tanabe et al. ............. 428/392 |
| 5,336,455 A | * | 8/1994 | Kelman ................... 264/113 |
| 5,665,295 A | * | 9/1997 | Takamoto et al. ...... 264/172.19 |
| 5,665,450 A | * | 9/1997 | Day et al. ................ 428/114 |
| 5,883,159 A | * | 3/1999 | Koizumi et al. .......... 523/217 |
| 5,935,510 A | * | 8/1999 | Hansen .................... 264/523 |
| 5,980,400 A | * | 11/1999 | Schickert ................. 473/481 |
| 6,322,893 B1 | | 11/2001 | Gauchel et al. |
| 6,572,736 B2 | * | 6/2003 | Bush et al. ............... 162/189 |
| 6,627,696 B1 | * | 9/2003 | Takao et al. .............. 524/588 |
| 6,648,613 B2 | * | 11/2003 | Clausson et al. ........ 417/423.1 |
| 6,808,224 B1 | * | 10/2004 | Obara .................... 296/146.5 |
| 6,929,280 B2 | * | 8/2005 | Yasuda et al. ........... 280/728.2 |
| 7,014,803 B2 | * | 3/2006 | Perez et al. ................ 264/80 |
| 7,105,125 B2 | * | 9/2006 | Obara .................... 264/540 |
| 7,175,199 B2 | * | 2/2007 | Muller .................... 280/756 |
| 7,284,218 B1 | * | 10/2007 | Roy et al. .................. 716/6 |
| 7,500,708 B2 | * | 3/2009 | Obara ..................... 296/70 |
| 2003/0087973 A1 | | 5/2003 | Muzzy |
| 2003/0143366 A1 | | 7/2003 | Foley |
| 2007/0116925 A1 | * | 5/2007 | Schatz et al. ............. 428/131 |
| 2007/0275224 A1 | * | 11/2007 | Viot et al. ............... 428/297.4 |

FOREIGN PATENT DOCUMENTS

| EP | 0 945 253 A2 | 9/1999 |
|---|---|---|
| EP | 1 008 528 A2 | 6/2000 |
| EP | 1 479 502 A1 | 11/2004 |

* cited by examiner

*Primary Examiner*—N. Edwards
(74) *Attorney, Agent, or Firm*—Oliff & Berridge, PLC

(57) ABSTRACT

The invention relates to a plastics material part for a motor vehicle, the part comprising polypropylene filled with non-recycled glass fibers. The part further comprises 15% to 25% polypropylene filled with recycled glass fibers.

8 Claims, No Drawings

MOTOR VEHICLE PART MADE OF PLASTICS MATERIAL COMPRISING POLYPROPYLENE FILLED WITH GLASS FIBERS

The present invention relates to a motor vehicle part of plastics material comprising polypropylene filled with glass fibers.

Polypropylene is already known and often used in making structural parts for motor vehicles. It is common practice to add a certain quantity of glass fibers to the polypropylene in order to improve the mechanical properties of the part, and in particular in order to increase its strength and stiffness.

It is also known that industry is required, and will in the future be required increasingly, to satisfy regulatory and ecological requirements leading to increased use of recycled materials.

Thus, industry, and in particular the automobile industry, is required to recycle the glass fibers it uses, thereby generating large quantities of recycled glass fiber.

From an economic and ecological point of view, it would thus be particularly advantageous to find an outlet or pertinent use for such recycled glass fibers.

Unfortunately, applications for recycled glass fibers are relatively limited since they cannot merely take the place of new glass fibers. Indeed, they do not possess mechanical properties that are equivalent. This is due to the fact that recycled glass fibers are much shorter than new glass fibers, and an important part of their mechanical properties is associated specifically with their length: the longer the fibers, the greater the performance of the material to which they are added.

Consequently, for most motor vehicle structural parts comprising polypropylene filled with glass fibers, mixtures are used of raw polypropylene, i.e. without glass fibers, and polypropylene filled with new glass fibers.

The present invention seeks to satisfy the above-mentioned regulatory, economic, and ecological concerns by proposing a motor vehicle part made of plastics material including recycled glass fibers, but without significantly reducing its mechanical properties.

To this end, the invention provides a plastics material part for a motor vehicle, the part comprising polypropylene filled with new glass fibers, and being characterized in that it further comprises 15% to 25% polypropylene filled with recycled glass fibers.

The inventors from whom the invention originates have understood that, surprisingly, a part made of plastics material in which said fraction of polypropylene filled with new glass fibers is replaced by polypropylene filled with recycled glass fibers, is such that the mechanical properties of the part are substantially unchanged compared with those of a part of conventional composition.

In addition, the inventors have also noticed that fabricating a part of the invention is particularly facilitated from a dimensional point of view. Vehicle parts can be of large dimensions, and they have a tendency to warp easily, because of the shrinkage of the plastics material as it cools down. It appears that using recycled glass fibers diminishes this tendency to warp, because the shrinkage of the plastics material is less, thus making it easier to comply with the dimensions of the part.

The recycled glass fibers of the invention may optionally be in micronized form, i.e. ground to the state of a fine white powder.

This characteristic is particularly advantageous since, from an industrial process point of view, it is difficult to handle recycled glass fiber. Recycled glass fiber is difficult to cope with since it has a volatile and cotton-wool texture, thus requiring operating conditions and safety measures to maintain the health of operators that are much more complicated than with new glass fiber. Recycled glass fiber powder in the micronized state is much easier to handle.

Nevertheless, this preparation is particularly surprising since the person skilled in the art has, in the past, always thought to use fibers that are as long as possible. Paradoxically, having recourse to micronized glass fibers, i.e. fibers that are even shorter than conventional recycled glass fibers, and a fortiori than new glass fibers, provides results that are satisfactory, since they enable the mechanical properties desired for the part to be maintained.

One hypothesis that might explain this paradox is that all of the fibers do not perform the same function within the materials: some of them (e.g. 15% to 25% of them) might have an influence that is local only, and replacing them by shorter glass fibers does nothing to degrade the rigidity and the strength of the material as a whole.

The use of recycled glass fibers in micronized form amplifies the above-described dimensional advantage. Shrinkage of the plastics material is even less.

A plastics material part of the invention may also include one or more of the following characteristics:
  the recycled glass fiber content in the polypropylene filled with glass fibers lies in the range 25% to 40%;
  the polypropylene filled with recycled glass fibers is recycled polypropylene;
  the part of the invention includes 20% to 50% polypropylene filled with non-recycled glass fibers;
  the polypropylene filled with new glass fibers comprises 20% to 70% new glass fibers;
  the part of the invention further includes recycled polypropylene that is raw, i.e. without any glass fibers;
  the part of the invention includes 20% to 50% raw recycled polypropylene; and
  the part of the invention is a structural part for a motor vehicle.

By way of non-limiting example of the invention, it is thus possible to fabricate a structural part for a motor vehicle, e.g. a bumper beam, a side rail, or a front end module, using a mixture comprising:
  about 20% recycled polypropylene filled to about 30% with recycled micronized glass fibers;
  about 40% new polypropylene filled to about 60% with new glass fibers; and
  about 40% raw recycled polypropylene.

For example, recourse may be had to the recycled glass fiber powder sold by the supplier M.C.R. under product reference P4300-02.

By way of example, the above mixture can serve in fabricating parts that used to be constituted in the state of the art by:
  new or recycled polypropylene filled to about 30% with new glass fibers; or
  a mixture in substantially equal proportions of raw polypropylene and of polypropylene filled to about 60% with new glass fibers, the raw polypropylene advantageously being recycled.

This substitution presents the advantage of making parts that comply better with regulations, since it increases the overall content of recycled ingredients in motor vehicles. For the same reason, it is economically more advantageous, since the cost price of recycled ingredients is less than that of new ingredients.

The invention also constitutes an advantageous use for recycled glass fibers that industry is generating in quantity but for which applications are few because of their properties being less good and because of the difficulties with handling them.

Finally, the invention clearly presents an ecological advantage.

It should be observed that the present invention is not limited to the implementation described above.

The invention claimed is:

1. A structural member for a motor vehicle comprising a plastic material part, the part comprising polypropylene reinforced with new glass fibers and polypropylene reinforced with recycled glass fibers, wherein the part comprises 15% to 25% by weight of the polypropylene reinforced with recycled glass fibers.

2. A structural member according to claim 1, wherein the polypropylene reinforced with glass fibers has a recycled glass fiber content of from 25% to 40% by weight.

3. A structural member according to claim 1, wherein the recycled glass fibers are in powder form.

4. A structural member according to claim 1, wherein the polypropylene reinforced with recycled glass fibers comprises recycled polypropylene.

5. A structural member according to claim 1, wherein the part comprises 20% to 50% by weight of the polypropylene reinforced with new glass fibers.

6. A structural member according to claim 1, wherein the polypropylene reinforced with new glass fibers has a new glass fiber content of from 20% to 70% by weight.

7. A structural member according to claim 1, further comprising raw recycled polypropylene not reinforced with any glass fibers.

8. A structural member according to claim 7, wherein the part comprises from 20% to 50% by weight of the raw recycled polypropylene.

* * * * *